United States Patent
Oi et al.

(10) Patent No.: US 7,222,483 B2
(45) Date of Patent: May 29, 2007

(54) DEVICE FOR SUPPLYING SECONDARY AIR

(75) Inventors: Yasuhiro Oi, Numazu (JP); Kaoru Ohtsuka, Mishima (JP); Shinya Kondo, Gotenba (JP); Hiroyasu Koyama, Mishima (JP); Tetsuji Nagata, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/197,507

(22) Filed: Aug. 5, 2005

(65) Prior Publication Data

US 2006/0048504 A1 Mar. 9, 2006

(30) Foreign Application Priority Data

Sep. 3, 2004 (JP) .............................. 2004-256866

(51) Int. Cl.
 *F01N 3/00* (2006.01)
(52) U.S. Cl. ............................ 60/289; 60/277; 60/290; 60/293
(58) Field of Classification Search .................. 60/277, 60/289, 290, 293
See application file for complete search history.

(56) References Cited

U.S. PATENT DOCUMENTS

| 5,542,292 | A | * | 8/1996 | Schneider et al. | ......... | 73/118.1 |
| 5,615,552 | A | * | 4/1997 | Shimasaki et al. | ............ | 60/277 |
| 5,735,121 | A | * | 4/1998 | Kato et al. | ..................... | 60/277 |
| 5,782,086 | A | * | 7/1998 | Kato et al. | ..................... | 60/274 |
| 6,023,401 | A | * | 2/2000 | Hashimoto et al. | ........ | 361/93.1 |
| 6,830,043 | B2 | * | 12/2004 | Morinaga et al. | ........... | 123/698 |
| 6,918,245 | B2 | * | 7/2005 | Hirooka et al. | ............... | 60/289 |
| 6,983,590 | B2 | * | 1/2006 | Roelle et al. | ................. | 60/289 |

FOREIGN PATENT DOCUMENTS

| EP |  | 1293648 A2 | 3/2003 |
| JP |  | A-2000-170530 | 6/2000 |
| JP |  | A-2003-83048 | 3/2003 |
| JP |  | A-2003-214248 | 7/2003 |

* cited by examiner

*Primary Examiner*—Thomas Denion
*Assistant Examiner*—Diem Tran
(74) *Attorney, Agent, or Firm*—Oliff & Berridge, PLC (57) ABSTRACT

There is provided a device for supplying secondary air, which comprises a secondary air passage for supplying secondary air, to an exhaust passage of an engine, upstream of an exhaust purification device provided in the exhaust passage, a pump provided in the secondary air passage for supplying a secondary air, a battery used for driving the pump, at least one opening-closing device for opening and closing the secondary air passage, and a pressure sensor provided between the pump and the opening-closing device for detecting a pressure in the secondary air passage. A malfunction of at least one of the pump and the opening-closing device is detected on the basis of at least one of the pressures detected when the secondary air passage is opens and when the secondary air passage is closed. The malfunction detection is ceased when the voltage of the battery changes by a value larger than a predetermined value when the pressure sensor detects a malfunction of the pressure variation in the secondary air passage for detecting a malfunction of at least one of the pump and the opening-closing device.

5 Claims, 8 Drawing Sheets

DEVICE FOR SUPPLYING SECONDARY AIR

BACKGROUND OF THE INVENTION

1. Field of the Invention

The invention relates to a device for supplying secondary air into an exhaust passage, of an engine, upstream of an exhaust purification device arranged in the exhaust passage.

2. Description of the Related Art

A known engine is comprises an exhaust purification device including a catalyst having an oxidizing ability in an exhaust passage for purifying carbon monoxide (hereinafter, referred to as "CO"), hydrocarbon (hereinafter, referred to as "HC") and nitrogen monoxide (hereinafter referred to as "NO") contained in an exhaust gas. Further, a technique for supplying air from an air pump into a secondary air supplying passage connected to the exhaust passage and having an opening-closing valve therein to supply the air as secondary air into the exhaust passage to increase the concentration of the oxygen in the exhaust gas, thereby facilitating the oxidation of HC and CO contained in the exhaust gas and thus purification of the exhaust gas, is known.

Japanese Unexamined Patent Publication No. 2003-83048 discloses a secondary air supplying device comprising an air pump, an opening-closing valve and a check valve along the flow direction of the secondary air. In the disclosed secondary air supplying device, a pressure sensor is arranged between the air pump and the opening-closing valve or between the opening-closing valve and the check valve. In such a device, when malfunction occurs in components such as the air pump and the opening-closing valve, the efficiency for purifying the exhaust gas decreases and an exhaust emission gets worse. Therefore, in the device, it is judged if the malfunction of the components occurs on the basis of the pressure detected by the pressure sensor and/or the variation of the pressure.

SUMMARY OF THE INVENTION

Generally, a battery is mounted on a vehicle provided with an engine. The battery is used to supply an electrical power to a lighting system of the vehicle as well as to components of the engine. For example, the battery supplies an electrical power to an ignition plug. Further, the battery supplies an electrical power to the components such as the air pump and the opening-closing valve of the secondary air supplying device.

The voltage of the battery temporarily decreases as it supplies the power to the above-mentioned components such as the lighting system, the ignition plug, the air pump, and the opening-closing valve. On the other hand, the voltage of the battery increases when the battery stops supplying the power to the above-mentioned components. In this connection, the ratios of such decreasing and increasing of the voltage of the battery are not constant, and depend on the electrical load of the lighting system, frequency for activating the ignition plug, the engine speed, the capacity of a generator of the engine, and the capacity and the deterioration of the battery, etc. Further, the voltage of the battery decreases gradually when the number of activations of the components increases.

Further, it is known that when the voltage of the battery decreases to a certain value, the possibility of detecting a malfunction of the secondary air supplying device inaccurately increases. Therefore, when the voltage of the battery becomes smaller than a predetermined voltage, detection of the malfunction of the components of the secondary air supplying device is not performed.

However, even when the voltage of the battery becomes smaller than the predetermined voltage, the battery can be used to activate, for example, the ignition plug. Therefore, until the voltage of the battery becomes smaller than a certain voltage smaller than the predetermined voltage, the battery is used. When the voltage of the battery becomes smaller than the certain voltage, the battery is replaced or charged, and thereafter, the detection of the malfunction of the components of the secondary air supplying device is performed. Therefore, when the voltage of the battery is between the predetermined voltage and the certain voltage, the detection of the malfunction of the components of the secondary air supplying device is not performed, In other words, in the case where the detection of the malfunction of the components of the secondary air supplying device depends on the voltage of the battery, the number of the detections of the malfunction of the components of the secondary air supplying device is limited.

The object of the invention is to provide a secondary air supplying device wherein an inaccurate detection of a malfunction of the components of the secondary air supplying device is prevented and the number of detections of a malfunction of the components of the secondary air supplying device is increased.

In order to accomplish the above-mentioned object, according to a first aspect of the invention, there is provided a device for supplying secondary air, comprising: a secondary air passage for supplying secondary air, to an exhaust passage of an engine, upstream of an exhaust purification device provided in the exhaust passage; a pump provided in the secondary air passage fox supplying a secondary air; a battery used for driving the pump; battery voltage detecting means for detecting a voltage of the battery; at least one opening-closing means for opening and closing the secondary air passage; a pressure sensor provided between the pump and the opening-closing means for detecting a pressure in the secondary air passage; malfunction detecting means for detecting a malfunction of at least one of the pump and the opening-closing means on the basis of at least one of the pressures detected when the opening-closing means opens the secondary air passage and when the opening-closing means closes the secondary air passage; and malfunction detection ceasing means for ceasing the malfunction detection by the malfunction detecting means when the voltage of the battery changes by a value larger than a predetermined value when the pressure sensor detects a malfunction of the pressure variation in the secondary air passage for detecting a malfunction of at least one of the pump and the opening-closing means by the malfunction detecting means.

When the voltage variation is larger than the predetermined value, the variation of the amount of the air flowing in the secondary air passage becomes large and thus the pressure variation of the air flowing in the secondary air passage becomes large On the other hand, the malfunction of at least one of the pump and the opening-closing means is judged on the basis of at least one of the pressures of the air flowing in the secondary air passage detected when the opening-closing means opens the secondary air passage and when the opening-closing means closes the secondary air passage. Accordingly, when the voltage variation is larger than the predetermined value, it can be judged that the pressure variation is large sufficiently to affect the detection of the malfunction. According to the first aspect of the invention, when the voltage variation is larger than the predetermined value, the detection of the malfunction is ceased and thus the inaccurate detection of the malfunction is prevented. Further, according to the first aspect of the invention, when the voltage of the battery is relatively small, but while the voltage variation of the battery is smaller than the predetermined value, the detection of the malfunction is performed. Therefore, the number of the detections of the malfunction of at least one of the pump and the opening-closing means becomes large.

According to the second aspect of the invention, on the basis of the first aspect of the invention, the predetermined value is defined on the basis of at least one of a speed of an engine provided with the device for supplying a secondary air, a load of the engine, and the voltage of the battery.

According to the third aspect of the invention, on the basis of the first aspect of the invention, the malfunction detecting means detects a malfunction of at least one of the pump and the opening-closing means on the basis of the pressures detected when the opening-closing means opens the secondary air passage and when the opening-closing means closes the secondary air passage, and wherein the malfunction detection ceasing means ceases the malfunction detection by the malfunction detecting means when the difference between the voltage of the battery detected by the battery voltage detecting means when the opening-closing means opens the secondary air passage and the voltage of the battery detected by the battery voltage detecting means when the opening-closing means closes the secondary air passage is larger than the predetermined value.

According to the second aspect of the invention, on the basis of the first aspect of the invention, the malfunction detecting means detects a malfunction of at least one of the pump and opening-closing means on the basis of the difference between the pressures detected when the opening-closing means opens the secondary air passage and when the opening-closing means closes the secondary air passage.

According to the second aspect of the invention, on the basis of the first aspect of the invention, the predetermined value is defined on the basis of at least one of a speed of an engine provided with the device for supplying a secondary air, a load of the engine, and the voltage of the battery.

Accordingly, the first to fifth aspects of the invention provide advantageous technical effect wherein the inaccurate detection of the malfunction of the components of the secondary air supplying device is prevented and the number of the detection of the malfunction thereof becomes large.

Further, the second and fifth aspects of the invention provides an advantageous technical effect wherein the predetermined value can be easily determined.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Below, an embodiment according to the invention will be explained by referring to the drawings. In the drawings, the same elements are indicated by the sane reference numerals. For facilitating understanding of the drawings, each figure has a suitable corresponding scale.

Figure 1:
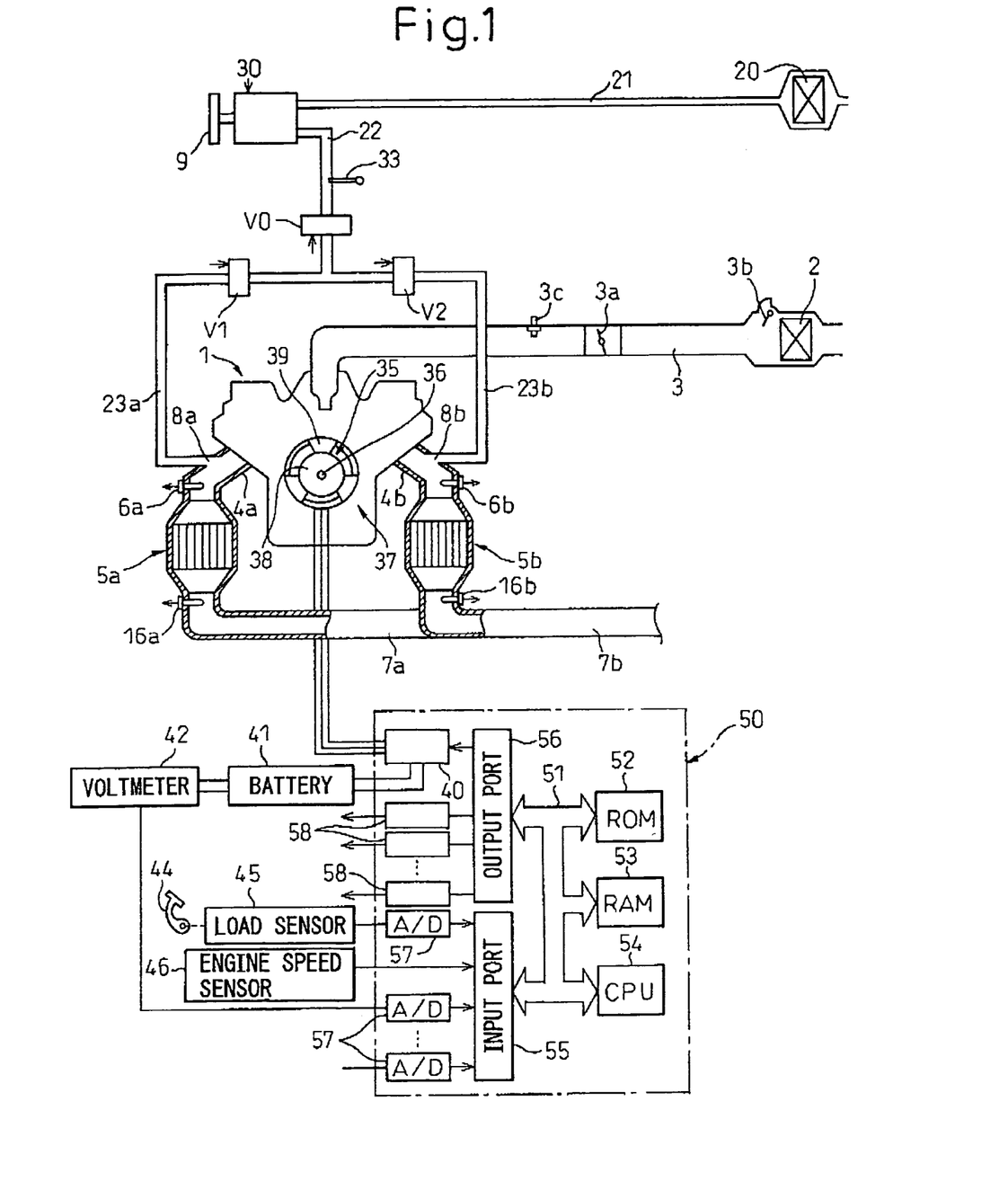
FIG. 1 shows a secondary air supplying device according to the invention.

FIG. 1 shows a secondary air supplying device according to the invention. A secondary air supplying device 30 according to the invention is mounted on an engine 1 such as multi-cylindered spark-ignition type V-configuration engine. As shown in FIG. 1, the cylinders of both banks of engine 1 are connected to exhaust pipes 7a and 7b via independent exhaust manifolds 4a and 4b, respectively. Catalytic converters 5a and 5b each including catalysts each having an oxidizing ability are arranged in exhaust pipes 7a and 7b, respectively. As explained below, catalytic converters 5a and 5b serve as an exhaust gas purification device. Secondary air supplying openings 8a and 8b are provided in exhaust pipes 7a and 7b upstream of catalytic converters 5a and 5b, respectively. Branch pipes 23a and 23b are connected to openings 8a and 8b, respectively. $O_2$ sensors 6a and 6b are arranged in exhaust pipes 7a and 7b upstream of catalytic converters 5a and 5b, respectively. Further, $O_2$ sensors 16a and 16b are arranged in exhaust pipes 7a and 7b downstream of catalytic converters 5a and 5b, respectively. The amount of $O_2$ consumed in catalytic converters 5a and 5b can be calculated by using $O_2$ concentrations detected by $O_2$ sensors 6a, 6b, 16a and 16b upstream and downstream of converters 5a and 5b. On the other hand, a throttle valve 3a is arranged in an intake pipe 3 for supplying an intake gas to the cylinders in the banks of the engine. Intake pipe 3 is connected to an air cleaner 2. An air flow meter 3b for measuring an amount of an air (primary air) is arranged between air cleaner 2 and throttle valve 3a. Further, a temperature sensor 3c for measuring a temperature of the intake gas is arranged in intake pipe 3.

Secondary air supplying device 30 includes an air intake pipe 21 which extends from an air cleaner 20. Pipe 21 is connected to an electrically-operated air pump 9. A secondary air supplying pipe 22 extends from pump 9. Pipe 22 branches into two branch pipes 23a and 23b. Pipes 23a and 23b are connected to secondary air supplying openings 8a and 8b of exhaust pipes 7a and 7b, respectively. As shown in FIG. 1, a control valve V0 is arranged in pipe 22. Further, control valves V1 and V2 are arranged in pipes 23a and 23b, respectively. Upstream control valve V0 is an electromagnetic valve which is opened and closed to control the flow rate of the secondary air flowing in pipes 22, 23a and 23b by an electric control unit (ECU) 50. On the other hand, downstream control valves V1 and V2 are air switching valves (ASVs) or vacuum switching valves (VSVs). Of course, upstream control valve V0 may be an ASV or a VSV, and downstream control valves V1 and V2 may be electromagnetic valves. Further, a pressure sensor 33 is arranged in pipe 22 upstream of control valve V0. That is, in the embodiment shown in FIG. 1, pressure sensor 33 is arranged between pump 9 and control valve V0.

In the embodiment shown in FIG. 1, a transmission 35 is connected to an output shaft of the engine 1. An electric motor 37 is connected to an output shaft 36 of transmission 35. For example, a normal automatic transmission with a torque converter, a continuously variable transmissions or an automatic transmission which automatically controls a clutching operation and a transmission operation in a manual transmission with a clutch is used as transmission 35.

Electric motor 37 connected to output shaft 36 of transmission 35 constitutes a device for generating a driving force other than a driving force generated by engine 1. In the embodiment shown in FIG. 1, motor 37 comprises an alternating current synchronous electric motor including a rotor 38 mounted on output shaft 36 of transmission 35 and having a plurality of permanent magnets on its periphery, and a stator 39 around which an exciting coil is wound for generating a revolving magnetic field, The exciting coil of stator 39 is connected to a motor driving control circuit 40. Circuit 40 is connected to a battery 41 which generates a high-voltage direct current. Therefore, engine 1 shown in FIG. 1 can be used as a hybrid engine. Battery 41 is connected to a lighting system (not shown in FIG. 1) of a vehicle on which engine 1 is mounted, an ignition device (not shown in FIG. 1) of engine 1, a stepping motor (not shown in FIG. 1) for controlling throttle valve 3a, and upstream control valve V0. Further, if downstream control valves V1 and V2 are electromagnetic valves, battery 41 is also connected thereto.

ECU 50 consists of a digital computer, and comprises ROM (read only memory) 52, RAM (random access memory) 53, CPU (micro processor) 54, an input port 55 and an output port 56, which are connected to each other by a bilateral bus 51. As shown in FIG. 1, output signals from $O_2$ sensors 6a and 6b arranged upstream of catalytic converters 5a and 5b and $O_2$ sensors 16a and 16b arranged downstream of catalytic converters 5a and 5b are input into input port 55 via corresponding A–D converters 57. Further, output signals from air flow meter 3b, pressure sensor 33 arranged in secondary air supplying pipe 22, temperature sensor 3c arranged in the intake passage, and a temperature sensor (not shown) for measuring a temperature of a coolant of engine 1 are input into input port 55 via corresponding A–D converters 57. A load sensor 45 for generating an output voltage in proportion to an amount of depression of an acceleration pedal 44 is connected to pedal 44. The output voltage from load sensor 45 is input into input port 55 via corresponding A–D converter 57. A crank angle sensor, as an engine speed sensor 46 for generating pulses every time the crank shaft rotates by, for example, 30 degrees, is connected to input port 55. On the other hand, output port 56 is connected to fuel injectors (not shown in FIG. 1) of engine 1, the stepping motor (not shown in FIG. 1) for controlling throttle valve 3a, control valve V0 arranged in secondary air supplying pipe 22, control valves V1 and V2 arranged in branch pipes 23a and 23b, respectively, and electrically-operated air pump 9 via corresponding drive circuits 58. Further, the different signals indicating the transmission ratio or stage of transmission 35 and the number of revolutions of output shaft 36 are input into input port 55. A voltmeter 42 for detecting a voltage of battery 41 is connected to input port 55 via corresponding A–D converter 57.

Normally, electric power is not supplied to the exciting coil of stator 39 of electric motor 37. In this case, rotor 38 rotates together with output shaft 36 of transmission 37. On the other hand, in order to drive the motor 37, the high-voltage direct current is converted by motor drive control circuit 40 to three-phase alternating current with a frequency fm and a current Im, which then is supplied to the exciting coil of stator 39. Frequency fm is a frequency necessary to rotate a revolving magnetic field generated by the exciting coil in synchronization with the rotor 38, and is calculated in CPU 54 on the basis of the number of the revolutions of output shaft 36. In motor drive control circuit 40, the frequency fm is employed as a frequency of the three-phrase alternating current, On the other hand, the output torque of electric motor 37 is in proportion to current Im of the three-phase alternating current Current Im is determined by CPU 54 on the basis of the output torque required of electric motor 37. Further, motor drive control circuit 40 employs this current Im as a three-phase alternating current. On the other hand, when motor 37 is driven by an external force, motor 37 serves as a power generator. In this case, the power generated by motor 37 is supplied to battery 41. In this connection, CPU 54 judges if motor 37 should be driven by the external force. When it judges that motor 37 should be driven by the external force, the power generated by motor 37 is supplied to battery 41 by motor drive control circuit 40.

For example, an oxidizing catalyst, a three-way catalyst, and a NOx catalyst, which discharges and purifies adsorbed NOx by reduction thereof, are used as the catalysts having an oxidizing ability, and are arranged in catalytic converters 5a and 5b. The NOx catalyst has an ability to discharge adsorbed NOx therefrom when an average air-fuel ratio in a combustion chamber becomes rich. Further, the NOx catalyst comprises, for example, one of an alkali metal such as kalium (K), lithium (Li), and cesium (Cs), alkali earth metal such as barium (Ba) and calcium (Ca), a rare earth such as lanthanum (La) and yttrium (Y), and a rare metal such as platinum (Pt), carried on an alumina substrate.

Secondary air supplying device 30 is mainly used when a fuel concentration of the mixture gas in the combustion chamber is large, i.e. the air-fuel ratio in the combustion chamber is small, such as when the engine starts, and when the temperatures of catalytic converters 5a and 5b serving as an exhaust purification device are not sufficiently large and therefore the purification function of the catalytic converters cannot be fulfilled. Further, the secondary air supplying device 30 according to the invention is used to supply the secondary air from secondary air supplying openings 8a and 8b to exhaust pipes 7a and 7b, in particular, is used to start supplying the secondary air after the supply of the secondary air is stopped temporarily.

Figure 2:
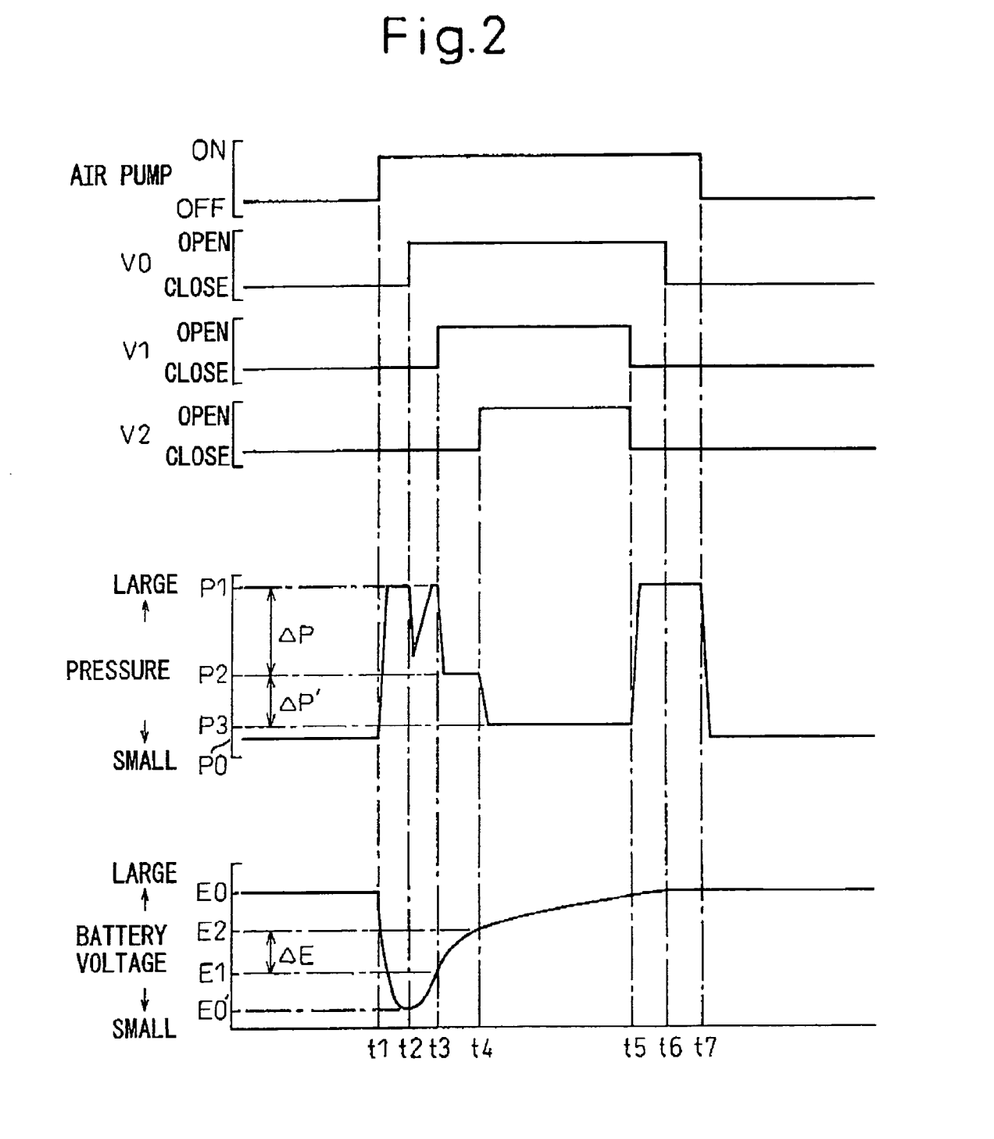
FIG. 2 shows a time chart of the operation, etc. of the components of the secondary air supplying device according to the invention.

FIG. 2 shows a time chart of the operation, etc. of the components of the secondary air supplying device according to the invention. The components of secondary air supplying device 30 are air pump 9, upstream control valve V0, first downstream control valve V1, and second downstream control valve V2. Below, the operation, etc. of the components of device 30 when they are in a normal condition will be explained by referring to FIG. 2.

As shown in FIG. 2, the malfunction of the components of secondary air supply device 30 is judged when air pump 9 is not activated (OFF) and upstream and downstream control valves V0, V1 and V2 are closed, i.e. when no air flows in secondary air supplying pipe 22. Further, as shown in FIG. 2, when the malfunction of the components is judged, air pump 9 is activated at a time t1. At this moment, because upstream control valve V0 is maintained closed, the pressure in pipe 22 detected by pressure sensor 33 increases from a pressure P0 to a pressure P1. Next, at a time t2, only upstream control valve V0 is opened. At this moment, because downstream control valves V1 and V2 are maintained closed, the pressure in pipe 22 temporarily decreases and thereafter increases to pressure P1.

Next, at a time t3, first downstream control valve V1 arranged in branch pipe 23a is opened. According to this, because the secondary air flows through pipe 23a, the pressure in secondary air supplying pipe 22 decreases from pressure P1 to a pressure P2. Next, at a time t4, the second downstream control valve V2 arranged in branch pipe 23b is opened. According to this, the pressure in pipe 22 decreases from pressure P2 to a pressure P3. When control valve V2 is opened, control valve V1 has been already opened and thus the secondary air flows into catalytic converter 5a. Therefore, a pressure variation delta P' between pressures P2 and P3 is smaller than a pressure variation delta P between pressures P1 and P2.

Next, when downstream control valves V1 and V2 are closed at a time t5, the pressure in secondary air supplying pipe 22 increases to pressure P1. Next, at a time t6, upstream control valve V0 is closed. At this moment, because downstream control valves V1 and V2 are closed, the pressure in pipe 22 does not vary. Next, the activation of air pump 9 is stopped. Thereafter, the pressure in pipe 22 decreases to pressure P0.

Regarding the voltage of battery 41 shown in FIG. 2, at time t1, the voltage of battery 41 is substantially decreased from an initial voltage E0 by the activation of air pump 9. In the embodiment shown in FIG. 1, because upstream control valve V0 is an electromagnetic valve, the voltage is further decreased to a voltage E0' by opening control valve V0 at time t2. Thereafter, as time passes, the voltage of battery 41 gradually increases, and then returns to near voltage E0 by closing control valve V0 at a time t6 and by stopping the operation of air pump 9 at a time t7. Although FIG. 2 shows that the voltage is at initial voltage E0 after time t7, the voltage after time t7 is practically slightly smaller than initial voltage E0.

As described above, the above explanation relates to the operations, etc. of the components of secondary air supplying device 30 when the components are in the normal conditions. Therefore, by judging if pressures P0, P1, P2 and P3 and pressure variations delta P and delta P' detected in practice are larger or smaller than corresponding values predetermined by an experiment, etc., a malfunction of the components can be detected.

The malfunction of air pump 9 includes a jammed-in-the-ON-condition wherein air pump 9 is maintained in an ON condition and thus its operation cannot be stopped, and a jammed-in-the-OFF-condition wherein air pump 9 is maintained in an OFF condition and thus cannot be operated. Further, the malfunction of control valves V0, V1 and V2 includes a jammed-in-the-opened-condition wherein the valve is maintained in an opened condition and thus cannot be closed, and a jammed-in-the-closed-condition wherein the valve is maintained in a closed condition and thus cannot be opened.

Further, diagnosis programs for detecting the above-mentioned malfunctions of air pump 9 and control valves V0, V1 and V2 are stored previously in ROM 52 or RAM 53 of ECU 50. The programs detect the malfunctions of the components of secondary air supplying device 30 on the basis of above-mentioned pressures P0, P1, P2 and P3 and pressure variations delta P and delta P'. Detailed explanation of the programs will be omitted.

Figure 3:
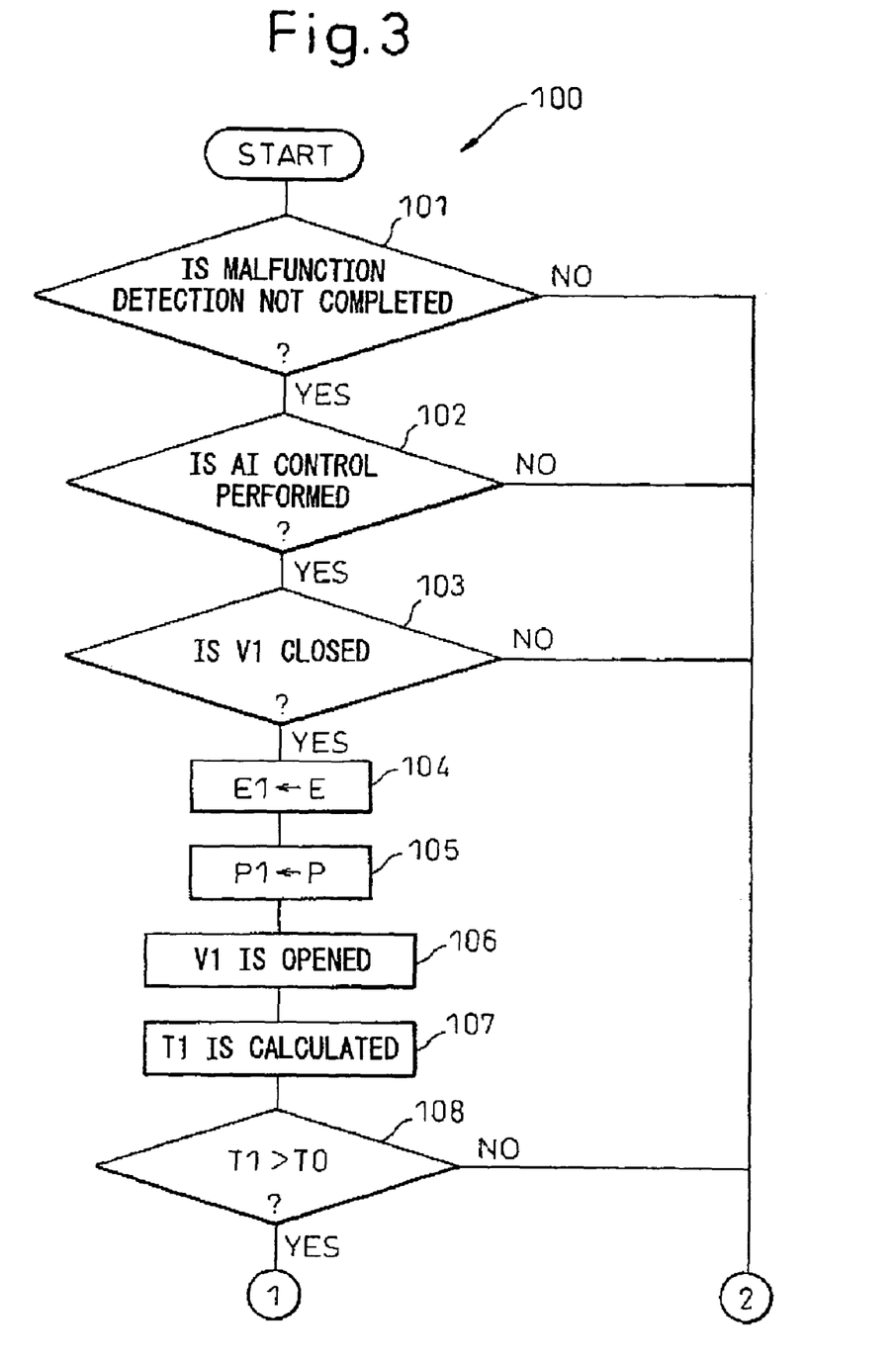
FIGS. 3 and 4 show a flowchart of a routine of the detection of the malfunction of the components of the secondary air supplying according to the invention.
Figure 4:
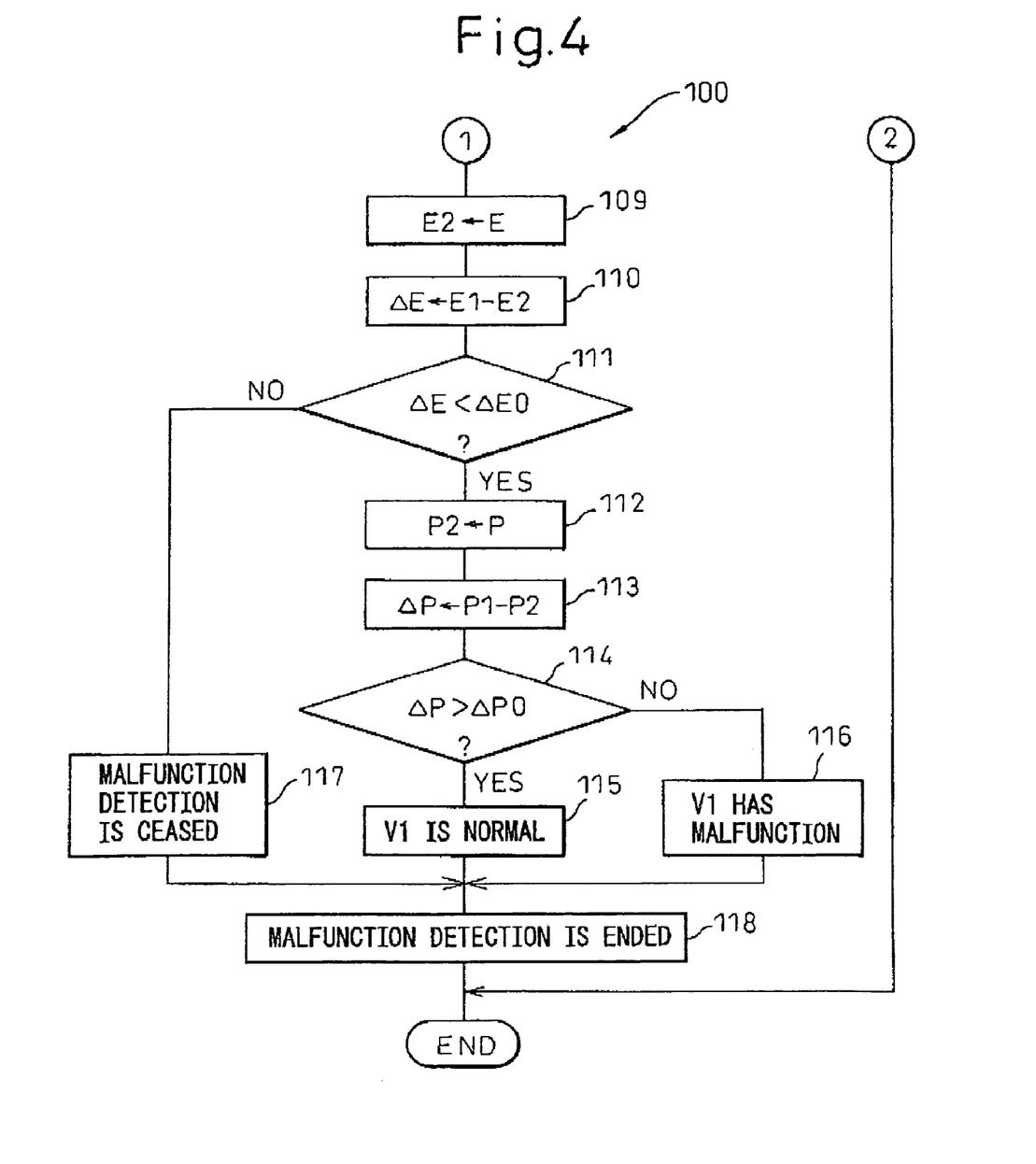

FIGS. 3 and 4 show a flowchart of an operation routine of the secondary air supplying device according to the invention. Operation routine 100 is a program for judging if the detection of the malfunction (the jammed-in-the-opened-condition) of first downstream control valve V1 should be performed, in practice, when it is desired that such a detection is performed.

At step 101 of operation routine 100 shown in FIG. 3, it is judged if the detection of the malfunction by a diagnosis program for detecting a jammed-in-opened-condition of first downstream control valve V1 has been completed. When it is judged that the detection of the malfunction has not been completed, the routine proceeds to step 102. That is, operation routine 100 shown in FIGS. 3 and 4 is performed, while the diagnosis program for first downstream control valve V1 is performed.

At step 102, it is judged if a secondary air supplying control (in the drawings and hereinafter, referred to as "AI") is performed at present. A program for performing the secondary air supplying control is stored in ROM 52 or RAM 53 of ECU 50. Further, when AI is performed, downstream and upstream control valves V1, V2 and V0 are opened and air pump 9 is operated and therefore the secondary air is supplied to catalytic converters 5a and 5b. At step 102, when it is judged that AI is performed, the routine proceeds to step 103. On the other hand, when it is judged at step 101 that the detection of the malfunction is completed and when it is judged at step 102 that AI is not performed, the routine is ended (see FIG. 4).

At step 103, it is judged it first upstream control valve V1 is closed. Step 103 is performed because operation routine 100 is a program for judging if the detection of the malfunction of control valve V1 should be performed and it is necessary to obtain the measured voltage of battery 41 and the measured pressure in secondary air supplying pipe 22 when control valve V1 is opened, and the measured voltages of battery 41 and the measured pressure in secondary air supplying pipe 22 when control valve V1 is closed. Further, when downstream control valve V1 is closed, control valve V2 is also closed (see FIG. 2). At step 103, when it is judged that control valve V1 is closed, the routine proceeds to step 104. On the other hand, at step 103, when control valve V1 is opened, the routine is ended.

At step 104, a present voltage E of battery 41 detected by voltmeter 42 is acquired as a closed-condition voltage E1. Next, at step 105, a present pressure P in secondary air supplying pipe 22 detected by pressure sensor 33 is acquired as a closed-condition pressure P1. Because the acquiring of voltage E1 and pressure P1 is performed when first downstream control valve V1 is closed, the acquiring is performed between times t2 and t3 in FIG. 2. In this connection, it is preferable to acquire voltage E1 and pressure P1 immediately before time t3 because pressure P in air intake pipe 21 is unstable immediately after upstream control valve V0 is opened. According to this, an accurate judgment on the basis of operation routine 100 can be performed. Further, in order to perform a more accurate judgment, it is desired that closed-condition voltage E1 and pressure P1 are acquired simultaneously.

Next, at step 106, first downstream control valve V1 is opened. The time of opening control valve V1 corresponds to time t3 in FIG. 2. Next, at step 107, a time period T1 elapsed after control valve V1 is opened is calculated by using a timer (not shown). Next, at step 108, it is judged if time period T1 is larger than a predetermined time period T0.

Figure 5A:
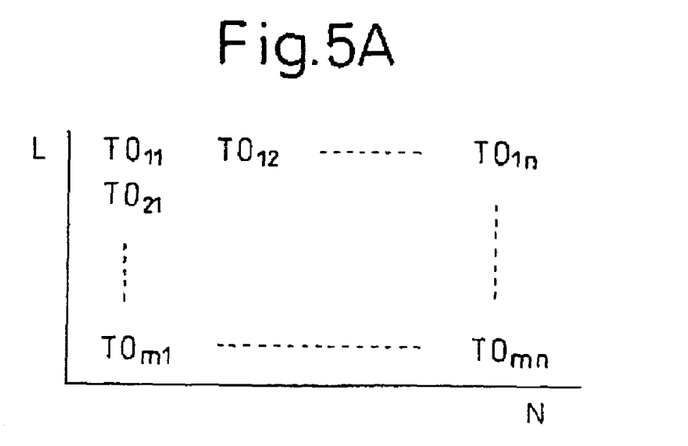
FIG. 5A shows a map of a predetermined time period T0.

Predetermined time period T0 is previously determined by experiment, etc, in consideration of the diagnosis program for control valve V1, and is set to a time period sufficient to make pressure P stable after control valve V1 is opened. FIG. 5A shows a map of predetermined time period T0. As shown in FIG. 5A, predetermined time period T0 is stored in ROM 52 or RAM 52 of ECU 50 in the function of engine load L and engine speed N.

At step 108, when it is judged that time period T1 is larger than predetermined time period T0, the routine proceeds to step 109 (FIG. 4). On the other hand, at step 108, when it is judged that time period T1 is not larger than predetermined time period T0, the routine is ended. Alternatively, when it is judged that time period T1 is not larger than predetermined time period T0 at step 108, the routine may return to step 107 and the process may be repeated until it is judged that time period T1 is larger than predetermined time period T0 at step 108.

At step 109 performed after first downstream control valve V1 is opened, present voltage E of battery 41, as detected by voltmeter 42, is acquired as an opened-condition voltage E2. The time of acquiring voltage E2 is after time t3 in FIG. 2 and preferably between times t3 and t4 in FIG. 2. Next, at step 110, a voltage variation delta E is calculated by subtracting voltage E2 from voltage E1 (step 104).

Figure 6:
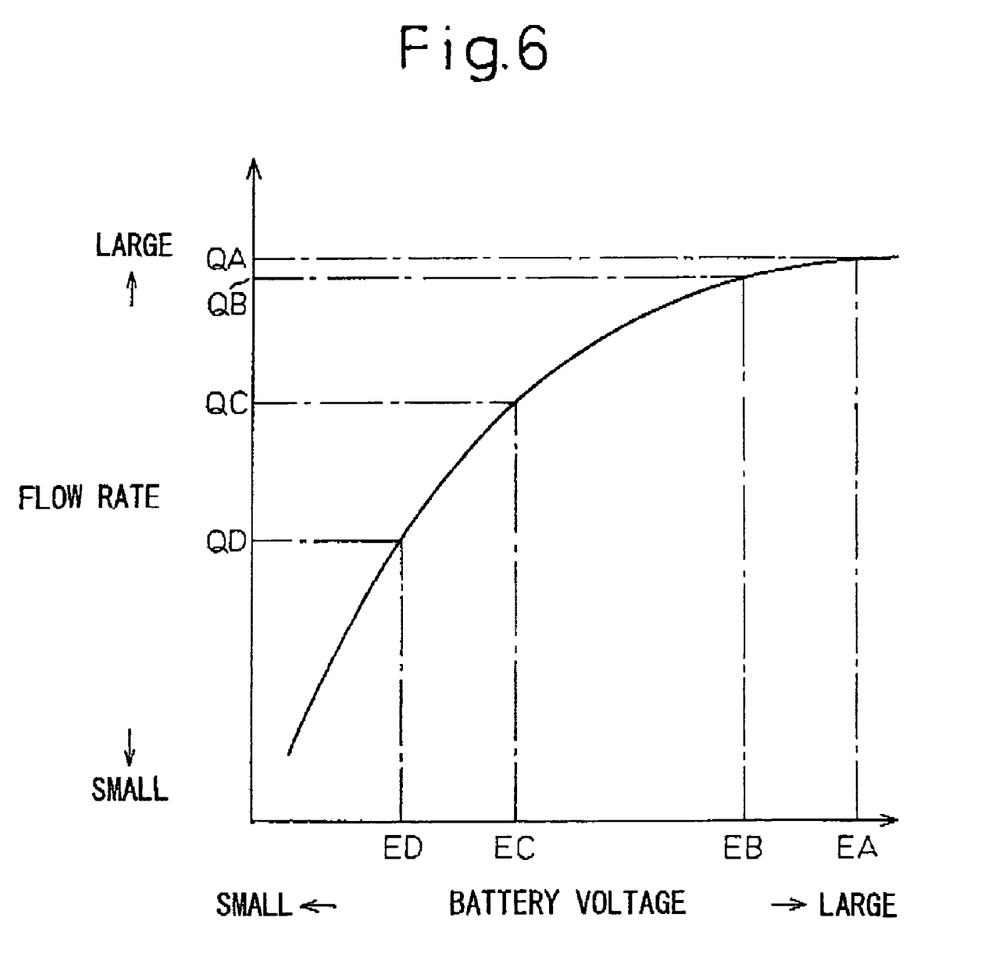
FIG. 6 shows a relationship between a voltage of a battery mounted on an engine and a rate of an air flowing in the secondary air supplying device.

FIG. 6 shows a relationship between a voltage of battery 41 mounted on the engine and a flow rate of the air flowing through the secondary air supplying pipe. In FIG. 6, the horizontal line indicates the voltage of the battery and the vertical line indicates the flow rate of the air flowing in the secondary air supplying pipe. The flow rate of the air is calculated on the basis of the pressure detected by the pressure sensor arranged in the secondary air supplying pipe, the sectional area of the secondary air supplying pipe, etc.

As shown in FIG. 6, when the voltage of the battery decreases, for example, from a relatively large voltage EA to a voltage EB, the air flow rate decreases slightly from a rate QA to a rate QB. On the other hand, when the voltage of the battery decreases from a relatively small voltage EC to a voltage ED, the air flow rate decreases substantially from a rate QC to a rate QD. That is, as can be understood from FIG. 6, although the voltage variation EC–ED between voltages EC and ED is equal to the voltage variation between voltages EA and EB, the variation QC–QD of the air flow rate corresponding to voltage variation EC–ED is substantially larger than variation QA–QB of the air flow rate corresponding to voltage variation EA–EB.

Figure 7:
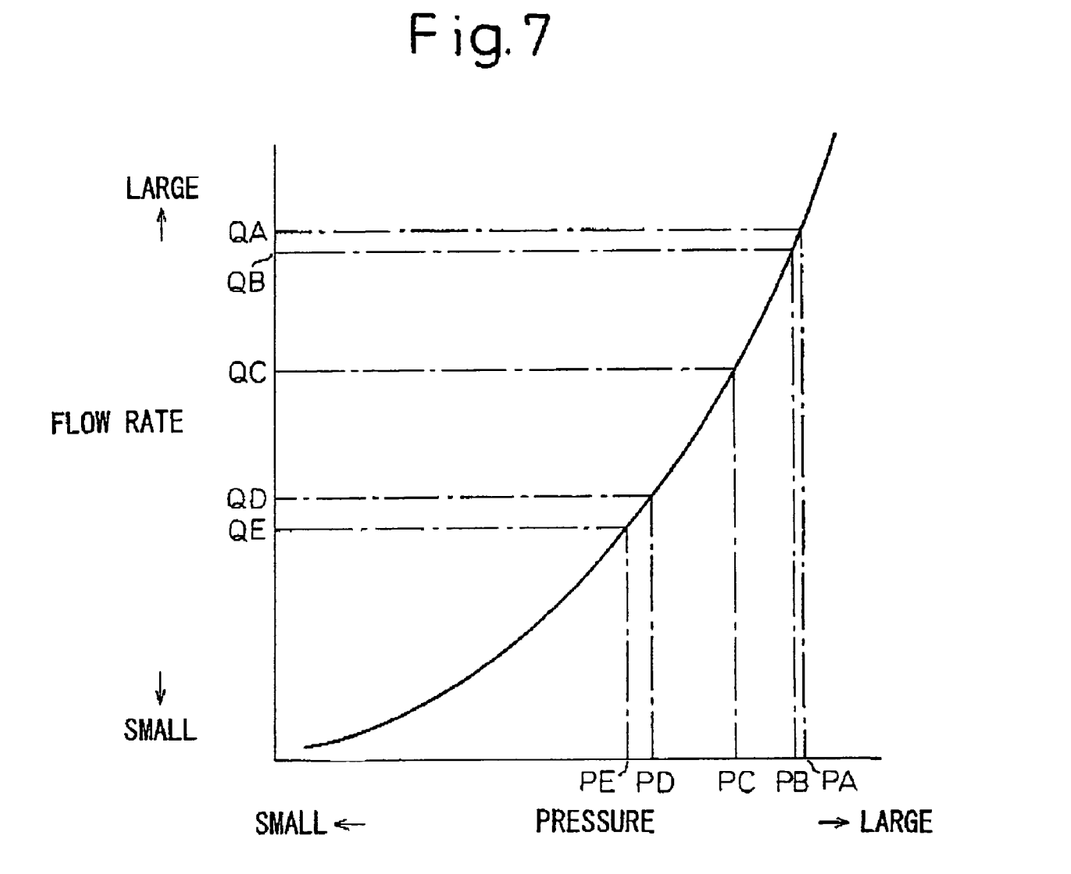
FIG. 7 shows a relationship between the rate and pressure of the air flowing in the secondary air supplying device.

Further, FIG. 7 shows a relationship between the flow rate and the pressure of the secondary air flowing in the secondary air supplying pipe. In FIG. 7, the horizontal line indicates the pressure of the secondary air and the vertical line indicates the flow rate of the secondary air. As can be understood from FIG. 7, as the pressure of the secondary air becomes large, the flow rate of the secondary air becomes exponentially larger. When the flow rate of the secondary air has changed from flow rate QA to flow rate QB, the pressure of the secondary air decreases from a pressure PA to a pressure PB and pressure variation PA–PB is relatively small. Therefore, such a change of the pressure does not affect the detection of the malfunction on the basis of the pressure variation. On the other hand, pressure variation PC–PD of the secondary air when the voltage of the battery is relatively small and the flow rate of the secondary air has changed from flow rate QC to flow rate QD is substantially larger than pressure variation PA–PB. Therefore, the pressure variation at this moment affects the detection of the malfunction and thus the malfunction may be detected inaccurately.

On the other hand, when the voltage of the battery is relatively small and the flow rate of the secondary air has decreased slightly from flow rate QD to flow rate QE, the pressure of the secondary air decreases from pressure PD to pressure PE. As shown in FIG. 7, the pressure variation PD–PE between pressures PD and PE is relatively small. In this connection, such a pressure variation does not affect the detection of the malfunction of the components on the basis of the pressure and the pressure variation even when the voltage of the battery is relatively small. That is, even when the voltage of the battery is relatively small, if the voltage variation is small and does not to affect the judgment of the malfunction, the judgment of the malfunction of the components can be performed.

Figure 5B:
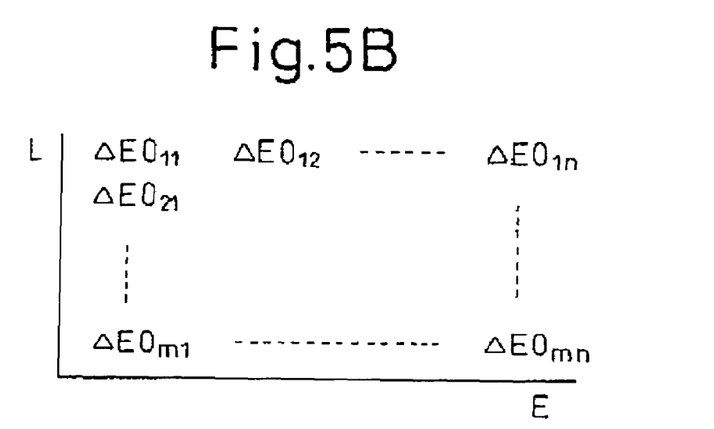
FIG. 5B shows a map of a predetermined voltage variation delta E0.

Again, referring to FIG. 4, at step 111, it is judged if voltage variation delta E (=E1–E2) is smaller than a predetermined voltage variation delta E0. Predetermined voltage variation delta E0 is previously determined by an experiment, etc. FIG. 5B shows a map of predetermined voltage variation delta E0. As shown in FIG. 5B, predetermined voltage variation delta E0 is stored in RAM 52 or RAM 53 of ECU 50 in the form of a map in the function of engine load L and voltage E (in particular, closed-condition voltage E1). Alternatively, the predetermined voltage variation delta E0 may be determined from the function of engine load L and a parameter other than voltage E such as, for example, engine speed N, or from a map in the function of three parameters such as engine load L, voltage E and engine speed N.

At step 111, when it is judged that voltage variation delta E is not smaller than predetermined voltage variation delta E0, i.e. delta E>=delta E0, the routine proceeds to step 117. In this case, the pressure variation corresponding to voltage variation delta E can be considered to be sufficiently large to affect the judgment of the malfunction and thus the detection of the malfunction is ceased. That is, at step 117, the judgment of the malfunction of first downstream control valve V1 of secondary air supplying device 30 is ceased. When voltage variation delta E is not smaller than predetermined voltage variation delta E0, the pressure variation corresponding to voltage variation delta E may affect the judgment of the malfunction and thus the malfunction may be detected inaccurately. In this connection, according to the invention, in such a case, the judgment of the malfunction is ceased and thus the inaccurate detection of the malfunction is prevented.

On the other hand, at step 111, when it is judged that voltage variation delta E is smaller than predetermined voltage variation delta E, the routine proceeds to step 112. At step 112, the pressure in secondary air supplying pipe 22 after control valve V1 is opened, i.e. opened-condition pressure P2 is detected by pressure sensor 33. That is, according to the invention, after it is confirmed that voltage variation delta E is smaller than predetermined voltage variation delta E0 and thus the corresponding pressure variation does not affect the judgment of the malfunction, opened-condition pressure P2 is detected. Therefore, when it is decided that the judgment of the malfunction of control valve V1 is ceased (step 117), opened-condition pressure P2 is not detected.

Figure 5C:
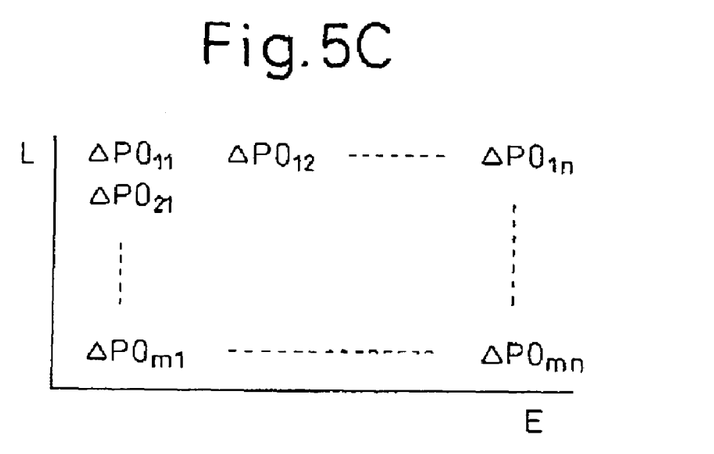
FIG. 5C shows a map of a predetermined pressure variation delta P0.

Next, at step 113, pressure variation delta P (=P1–P2) from when control valve V1 is closed to when control valve V1 is opened is calculated. Next, at step 114, it is judged if pressure variation delta P is larger than a predetermined pressure variation delta P0. Predetermined pressure variation delta P0 is previously determined by an experiment, etc. FIG. 5C shows a map of predetermined pressure variation delta P0. As shown in FIG. 5C, predetermined pressure variation delta P0 is stored in ROM 52 or RAM 53 of ECU 50 in the form of a map in the function of engine load L and voltage E (in particular, closed-condition voltage E1). Alternatively, the predetermined pressure variation delta P0 may be determined from a function of engine load L and a parameter other than voltage E such as, for example, engine speed N or from a function of three parameters such as engine load L, voltage E and engine speed N.

As described above, when the first downstream control valve V1 is normal, pressure variation delta P (=P1−P2) shown in FIG. 2 is larger than pressure variation delta P' (=P2−P3) from when second downstream control valve V2 is closed to when control valve V2 is opened. Therefore, if pressure variation delta P is not larger than predetermined pressure variation delta P0, it can be judged at step 116 that a malfunction, for example, a jammed-in-the-opened-condition occurs in first downstream control valve V1 at step 116. On the other hand, when pressure variation delta P is larger than predetermined pressure variation delta P, it is judged at step 115 that control valve V1 is normal, Next, at step 118, the detection of the malfunction is ended. Thereafter, the routine may return to step 101 and the operation routine 100, shown in FIGS. 3 and 4, may be repeated.

In operation routine 100, only the jammed-in-the-opened-condition of first downstream control valve V1 is judged. Further, the other judgment of the malfunction such as a jammed-in-the-closed-condition of first downstream control valve V1, jammed-in-the-opened and closed-conditions of upstream control valve V0, jammed-in-the-opened and closed-conditions of second downstream control valve V2, and jammed-in-the-ON and OFF-conditions of air pump 9 may be detected by a separate program similar to operation routine 100.

The malfunction of control valves V0, V1 and V2 is detected by detecting pressures when each control valve is opened and when it is closed, by calculating a pressure variation therebetween, and by comparing the detected pressures with corresponding predetermined pressures and comparing the calculated pressure variation with a corresponding predetermined pressure variation. In this connection, the detailed explanation of the program for detecting the malfunction of control valves V0, V1 and V2 will be omitted. Similarly, the malfunction of air pump 9 is detected by detecting pressures when either control valve is opened and when it is closed, by calculating a pressure variation therebetween, and by comparing the detected pressures with corresponding pressures and comparing the calculated pressure variation with a corresponding pressure variation. In this connection, the detailed explanation of the program for detecting the malfunction of air pump 9 will be omitted.

In operation routine 100 according to the invention, it is only judged at step 111 if voltage variation delta E is smaller than predetermined voltage variation delta E0, and it is not judged if closed-condition voltage E1 and/or opened-condition voltage E2 are/is larger than corresponding predetermined values. That is, even when closed-condition voltage E1 and/or opened-condition voltage E2 are/is relatively small, if voltage variation delta E is smaller than corresponding predetermined voltage variation delta E0, the malfunction of control valve V1 is judged. On the other hand, as described above, in the prior art, when voltage E is smaller than a predetermined voltage, the judgment of the malfunction of the components of secondary air supplying device 30 is not performed and therefore the detection of a malfunction of the components is not performed. On the other hand, according to the invention, even when voltage E is relatively small, if voltage variation delta E is within a predetermined range, the judgment of the malfunction is performed and therefore the number of the detections increases.

Further, in operation routine 100 according to the invention, at step 111, even when closed-condition voltage E1 and/or opened-condition voltage E2 are/is relatively large, if voltage variation delta E is not smaller than corresponding predetermined voltage variation delta E0, the detection of the malfunction is ceased. That is, when voltage variation delta E is not smaller than corresponding predetermined voltage variation delta E0, pressure variation delta P is large and, therefore, a malfunction may be detected inaccurately. In this connection, according to the invention, it is prevented that the malfunction is detected inaccurately when closed-condition voltage E1 and/or opened-condition voltage E2 are/is relatively large.

Figure 8:
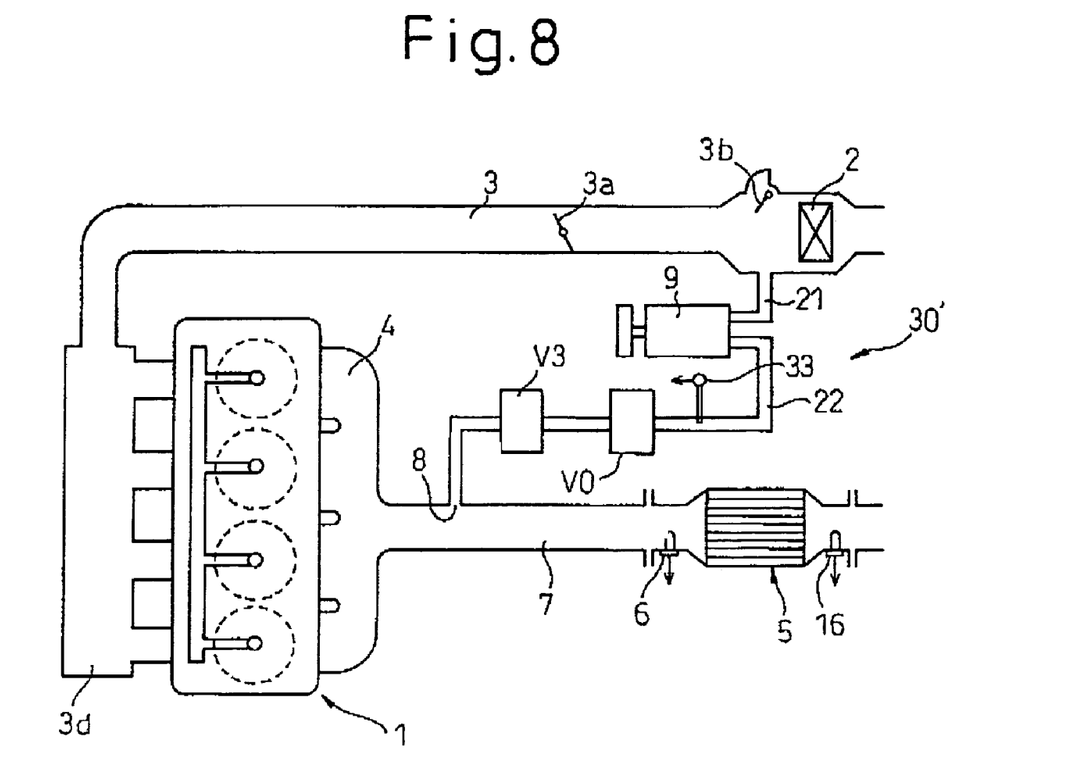
FIG. 8 shows another engine provided with the secondary air supplying device according to the invention.

In the above, a secondary air supplying device 30 according to the invention has been explained by referring to FIG. 1. However, an engine on which secondary air supplying device 30 can be mounted is not limited to the multi-cylindered spark ignition type V-configuration engine comprising two separate banks as shown in FIG. 1. FIG. 8 shows another engine on which the secondary air supplying device according to the invention can be mounted. Engine 1 shown in FIG. 8 comprises a single bank, an intake manifold 3d extending from an intake pipe 3 being connected to one side of engine 1 and an exhaust manifold 4 being connected to the other side of engine 1.

Further, a secondary air supplying device 30' shown in FIG. 8 comprises an air intake pipe 21, an electrically-operated air pump 9, and a secondary air supplying pipe 22. A pressure sensor 33 and a control valve V0 are arranged in a secondary air supplying pipe 22 from the upstream side. Further, a control valve V3 is arranged in pipe 22 downstream of control valve V0. Further, pipe 22 is connected to an exhaust pipe 7 of engine 1. As shown in FIG. 8, a catalytic converter 5 which carries a catalyst having an oxidizing ability is arranged in exhaust pipe 7. $O_2$ sensors 6 and 16 are arranged upstream and downstream of catalytic converter 5, respectively.

To facilitate understanding, ECU 50' is not shown in FIG. 8. However, ECU 50' is similar to ECU 50 shown in FIG. 1. The position of pressure sensor 33 and the number of control valves V0 and V3 are not limited and, for example, even if control valve V3 is not provided, the invention can apply to an embodiment wherein the malfunction of the components such as air pump 9 and control valve V0 of secondary air supplying device 30' can be detected on the basis of pressure in secondary air supplying pipe 22 detected by pressure sensor 33 and the pressure variation in pipe 22.

Further, the invention covers an embodiment wherein the voltage of battery 41 (not shown in FIG. 8) is detected by voltmeter 42 (not shown in FIG. 8), and the detection of the malfunction is ceased when the voltage variation is larger than a predetermined voltage variation, in such a secondary air supplying device 30'.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A device for supplying secondary air, comprising:
   a secondary air passage for supplying secondary air, to an exhaust passage of an engine, upstream of an exhaust purification device provided in the exhaust passage;

a pump provided in the secondary air passage for supplying a secondary air;

a battery used for driving the pump;

battery voltage detecting means for detecting a voltage of the battery;

at least one opening-closing means for opening and closing the secondary air passage;

a pressure sensor provided between the pump and the opening-closing means for detecting a pressure in the secondary air passage;

malfunction detecting means for detecting a malfunction of at least one of the pump and the opening-closing means on the basis of at least one of the pressures detected when the opening-closing means opens the secondary air passage and when the opening-closing means closes the secondary air passage; and malfunction detection ceasing means for ceasing the malfunction detection by the malfunction detecting means when the voltage of the battery changes by a value larger than a predetermined value when the pressure sensor detects a malfunction of the pressure variation in the secondary air passage for detecting a malfunction of at least one of the pump and the opening-closing means by the malfunction detecting means.

2. A device for supplying secondary air, as set forth in claim 1, wherein the predetermined value is defined on the basis of at least one of a speed of an engine provided with the device for supplying a secondary air, a load of the engine, and the voltage of the battery.

3. A device for supplying secondary air, as set forth in claim 1, wherein the malfunction detecting means detects a malfunction of at least one of the pump and the opening-closing means on the basis of the pressures detected when the opening-closing means opens the secondary air passage and when the opening-closing means closes the secondary air passage, and wherein the malfunction detection ceasing means ceases the malfunction detection by the malfunction detecting means when the difference between the voltage of the battery detected by the battery voltage detecting means when the opening-closing means opens the secondary air passage and the voltage of the battery detected by the battery voltage detecting means when the opening-closing means closes the secondary air passage is larger than the predetermined value.

4. A device for supplying secondary air, as set forth in claim 3, wherein the malfunction detecting means detects a malfunction of at least one of the pump and opening-closing means on the basis of the difference between the pressures detected when the opening-closing means opens the secondary air passage and when the opening-closing means closes the secondary air passage.

5. A device for supplying secondary air, as set forth in claim 4, wherein the predetermined value is defined on the basis of at least one of a speed of an engine provided with the device for supplying a secondary air, a load of the engine, and the voltage of the battery.

* * * * *